(12) United States Patent
Quenzer (10) Patent No.: US 12,168,399 B2
(45) Date of Patent: Dec. 17, 2024

(54) BATTERY BOOST CONVERTER SYSTEM

(71) Applicant: Trek Bicycle Corporation, Waterloo, WI (US)

(72) Inventor: Jon Quenzer, German Valley, IL (US)

(73) Assignee: TREK BICYCLE CORPORATION, Waterloo, WI (US)

( * ) Notice: Subject to any disclaimer, the term of this patent is extended or adjusted under 35 U.S.C. 154(b) by 29 days.

(21) Appl. No.: 17/931,158

(22) Filed: Sep. 12, 2022

(65) Prior Publication Data

US 2023/0084885 A1    Mar. 16, 2023

Related U.S. Application Data (60) Provisional application No. 63/243,241, filed on Sep. 13, 2021.

(51) Int. Cl.
| | | |
|---|---|---|
| *B60L 53/20* | (2019.01) | |
| *B62J 43/13* | (2020.01) | |
| *B62J 43/20* | (2020.01) | |
| *B62M 6/45* | (2010.01) | |
| *B62M 6/90* | (2010.01) | |
| *H02J 7/00* | (2006.01) | |
| *H02M 1/08* | (2006.01) | |
| *H02M 3/156* | (2006.01) | |
| *H02P 7/292* | (2016.01) | |

(52) U.S. Cl.
CPC .............. *B60L 53/20* (2019.02); *B62J 43/13* (2020.02); *B62J 43/20* (2020.02); *B62M 6/45* (2013.01); *B62M 6/90* (2013.01); *H02J 7/0063* (2013.01); *H02M 1/08* (2013.01); *H02M 3/156* (2013.01); *H02P 7/292* (2013.01); *H02P 2201/09* (2013.01)

(58) Field of Classification Search
CPC .......... B60L 53/20; B62J 43/20; B62J 43/13; B62M 6/45; B62M 6/90; H02J 7/0063; H02M 1/08; H02M 3/156; H02P 7/292; H02P 2201/09

See application file for complete search history.

(56) References Cited

U.S. PATENT DOCUMENTS

| | | | |
|---|---|---|---|
| 2018/0048265 A1* | 2/2018 | Nentwig | ................. H03F 3/217 |
| 2020/0298722 A1* | 9/2020 | Smolenaers | ............ H02J 7/345 |
| 2021/0086705 A1* | 3/2021 | Gindin | ................... H04N 7/183 |
| 2023/0415839 A1* | 12/2023 | Ozaki | ..................... B62J 43/16 |

* cited by examiner

*Primary Examiner* — Zoheb S Imtiaz
(74) *Attorney, Agent, or Firm* — Bell & Manning, LLC (57) ABSTRACT

A battery boost converter system for a bicycle includes a bicycle frame and a motor mounted to the bicycle frame. The system also includes a battery mounted to the bicycle frame and configured to provide power to the motor. The system also includes a boost converter configured to receive a first output signal from the battery and to provide a second output signal to the motor. The boost converter is also configured to determine, based on an operating condition, whether to boost a voltage of the first output signal such that the second output signal has an increased voltage.

20 Claims, 9 Drawing Sheets

|     | 10S (36V) | 11S (40V) | 12S (44V) | 13S (48V) | 14S (52V) |
|-----|-----------|-----------|-----------|-----------|-----------|
| 1P  | 180 Wh    | 198 Wh    | 216 Wh    | 234 Wh    | 252 Wh    |
| 2P  | 360 Wh    | 396 Wh    | 432 Wh    | 468 Wh    | 504 Wh    |
| 3P  | 540 Wh    | 594 Wh    | 648 Wh    | 702 Wh    | 756 Wh    |

BATTERY BOOST CONVERTER SYSTEM

CROSS-REFERENCE TO RELATED APPLICATIONS

The present application claims the priority benefit of U.S. provisional patent application No. 63/243,241 that was filed Sep. 13, 2021, the entire contents of which are incorporated herein by reference.

BACKGROUND

Electric bicycles often use brushless electric motors to assist the rider in moving the bicycle. Brushless motors that are used in electric bikes are often powered by lithium-ion batteries. The batteries provide a direct current (DC) voltage to a motor controller that is used to drive the motor. Among other functions, the motor controller is generally able to reduce the motor drive voltage by pulse width modulating the switches that control current flow to the three phases of the motor.

SUMMARY

An illustrative battery boost converter system for a bicycle includes a bicycle frame and a motor mounted to the bicycle frame. The system also includes a battery mounted to the bicycle frame and configured to provide power to the motor. The system also includes a boost converter configured to receive a first output signal from the battery and to provide a second output signal to the motor. The boost converter is also configured to determine, based on an operating condition, whether to boost a voltage of the first output signal such that the second output signal has an increased voltage.

In some embodiments, the operating condition is an operating voltage for the motor, and wherein the boost converter is configured to bypass a boost circuit responsive to a determination that the first output signal from the battery satisfies the operating voltage for the motor such that the second output signal is the same as the first output signal. In another embodiment, the boost converter is configured to use the boost circuit responsive to a determination that the first output signal from the battery does not satisfy the operating voltage for the motor such that the second output signal is boosted relative to the first output signal. In another embodiment, the operating condition comprises a desired speed of the bicycle. In one embodiment, the operating condition comprises a desired torque of the bicycle. In another embodiment, the boost converter is configured to gradually increase the voltage of the first output signal over a predetermined period of time.

In one embodiment, the boost converter includes a field-effect transistor and a field-effect transistor driver coupled to the field effect transistor. In another embodiment, the field-effect transistor comprises a gallium nitride field-effect transistor. In an illustrative embodiment, a boost circuit forms at least a portion of the boost converter, and a branch of the boost circuit includes an inductor and a diode positioned between the battery and the motor. In another embodiment, the boost circuit includes a bypass controller connected to the branch of the boost circuit that is between the battery to the motor.

An illustrative method of controlling voltage of a bicycle includes receiving, at a boost converter, a first output signal from a battery that is mounted to a frame of the bicycle. The method also includes determining, based on an operating condition of the bicycle, whether to boost the first output signal. The method further includes boosting, by the boost converter and responsive to a determination that the first output signal is to be boosted, the first output signal to generate a second output signal that has an increased voltage relative to the first output signal. The second output signal is provided to a motor that is mounted to the frame of the bicycle.

Other principal features and advantages of the invention will become apparent to those skilled in the art upon review of the following drawings, the detailed description, and the appended claims.

BRIEF DESCRIPTION OF THE DRAWINGS

Illustrative embodiments will hereafter be described with reference to the accompanying drawings, wherein like numerals denote like elements. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

An electric bicycle includes an electric motor that is often powered, at least in part, by one or more batteries. The power delivered to the motor can be controlled using a motor controller. In situations requiring low power for the motor (e.g., traveling downhill on the bicycle), a traditional motor controller is able to reduce the motor drive voltage by pulse width modulating the switches that control current flow to the three phases of the motor. However, there are also situations where the motor is under high load, and in which it is desirable to increase the voltage that is provided to the motor. Traditional motor controllers and electric bike battery systems do not provide any way to implement such a voltage increase in the power that is provided from the battery to the motor.

Figure 1:
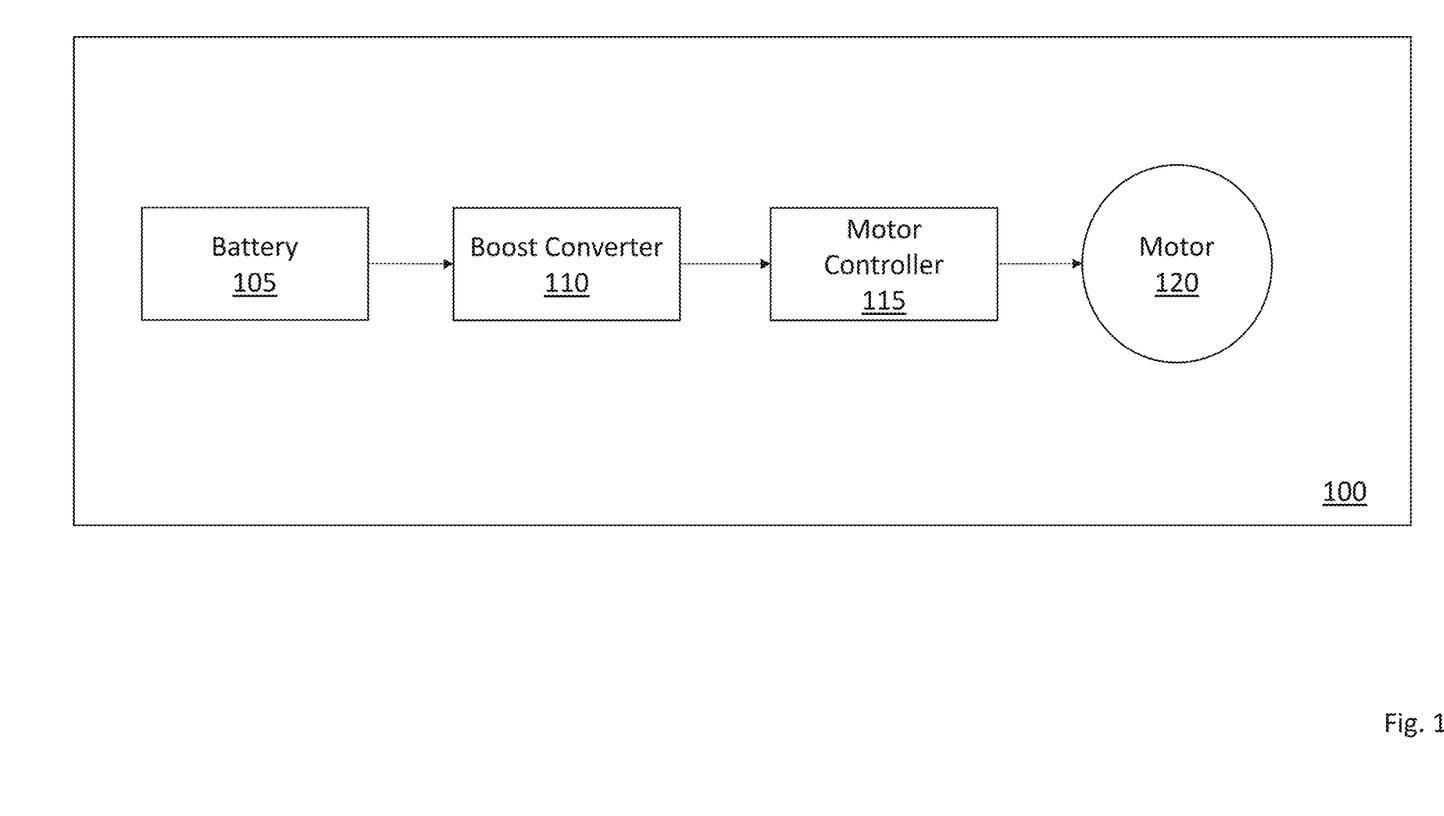
FIG. 1 is a block diagram of an electric bicycle that includes a battery boost converter system in accordance with an illustrative embodiment.

Described herein is a battery boost converter system that allows the bicycle motor to receive a power signal having increased voltage as compared to a nominal (or normal) operating voltage provided by the battery. FIG. 1 is a block diagram of an electric bicycle 100 that includes a battery boost converter system in accordance with an illustrative embodiment. As discussed in more detail below, the electric bicycle 100 includes a battery 105, a boost converter 110, a motor controller 115, and a motor 120. In alternative embodiments, the system may include fewer, additional, and/or different components. For example, the electric bicycle can also include tires, rims, a frame, pedals, a saddle, handlebars, brakes, etc. Regarding the components depicted in FIG. 1, any type of battery, motor controller, and motor compatible with a bicycle and known in the art may be used.

Figure 2:
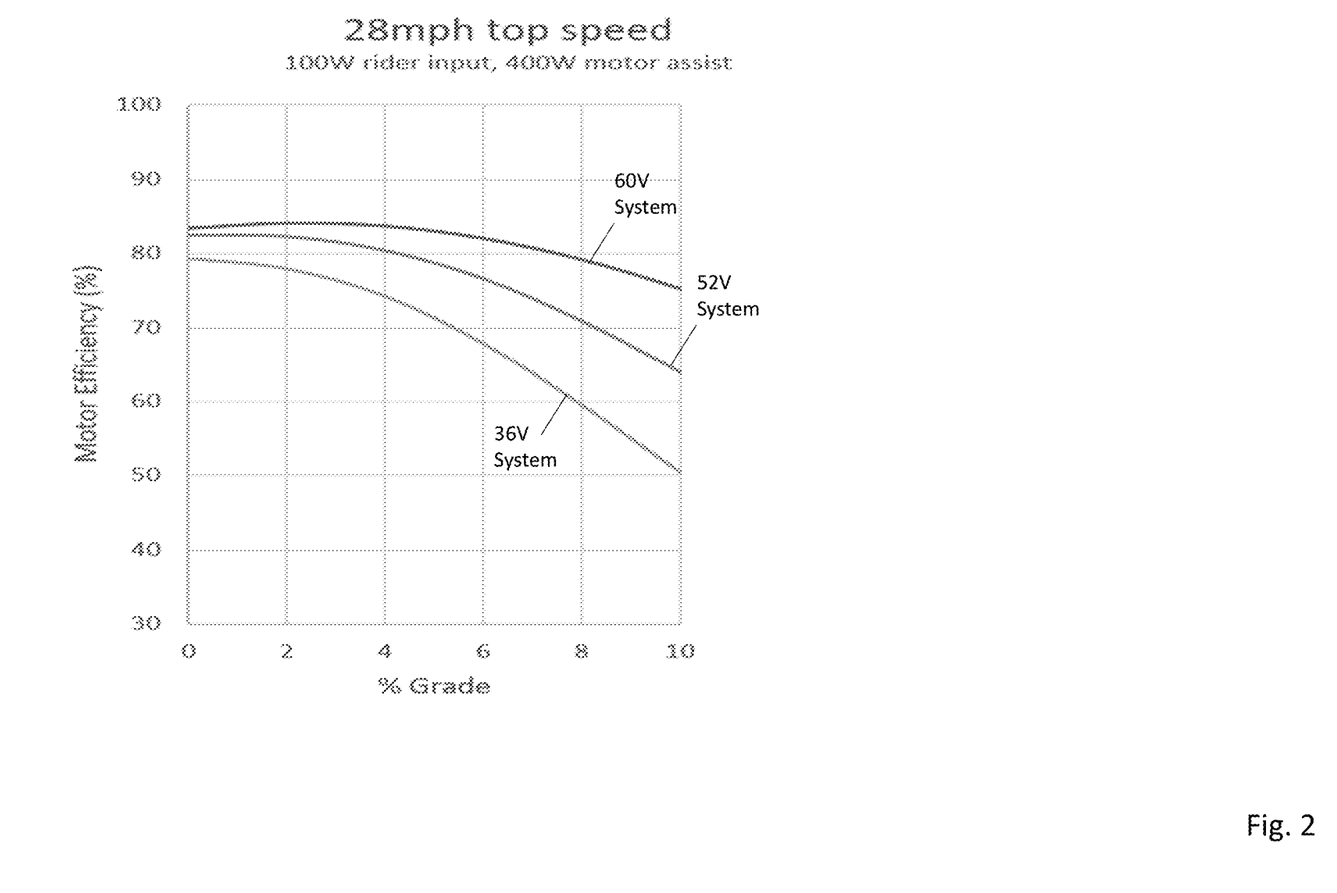
FIG. 2 is a graph that shows data from a ride simulator for a hub motor that is tuned to assist a typical electric bicycle to a speed of 28 mph in accordance with an illustrative embodiment.

The boost converter system of FIG. 1 can be used to provide a voltage to the motor that exceeds the voltage rating of the battery powering the motor. Such a higher motor voltage provides higher efficiency for a wide range of motor rotations per minute (rpms) as compared to a traditional system. Also, for a mid-drive motor, such higher efficiency translates to a larger range of efficient cadences. For a hub motor system, the improved efficiency translates to better climbing efficiency at low speed while still being able to reach high top speeds. FIG. 2 is a graph that shows data from a ride simulator for a hub motor that is tuned to assist a typical electric bicycle to a speed of 28 mph in accordance with an illustrative embodiment. FIG. 2 includes plots for a 60 Volt (V) system, a 52 V system, and a 36 V system.

Figure 3:
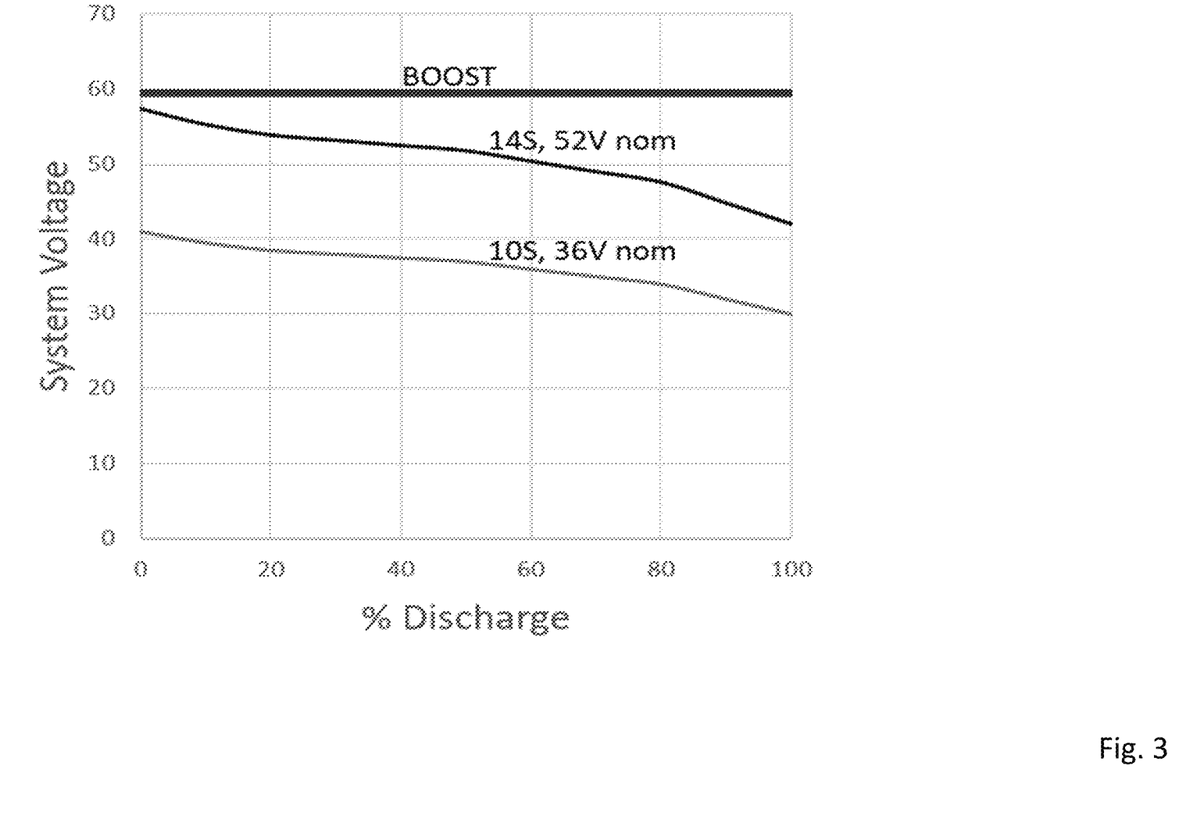
FIG. 3 is a graph that shows the typical system voltages for lithium-ion batteries compared to a system that uses a boost converter set for 60V in accordance with an illustrative embodiment.

The proposed battery boost converter system also allows the motor to be provided with a constant voltage. In a traditional system, when the voltage to the motor controller is provided directly from the battery, the voltage varies as the battery discharges. However, with a boost converter in between the battery and motor controller, the voltage can be held constant. FIG. 3 is a graph that shows the typical system voltages for lithium-ion batteries compared to a system that uses a boost converter set for 60V in accordance with an illustrative embodiment. As shown, the system that utilizes the boost converter maintains a constant 60V system voltage, whereas the systems without boost converters have voltages that vary significantly over the course of battery discharging.

With a constant voltage that can be provided through the proposed battery boost converter system, the electric motor can be tuned to perform optimally at a single voltage. This feature helps eliminate problems with maintaining speed that may be encountered in traditional systems. For example, a known problem with some hub motor systems is they are tuned to perform efficiently at a high voltage. However, once the voltage drops in such systems due to battery depletion (or degradation), the maximum assist speed cannot be maintained any longer.

Figure 4:
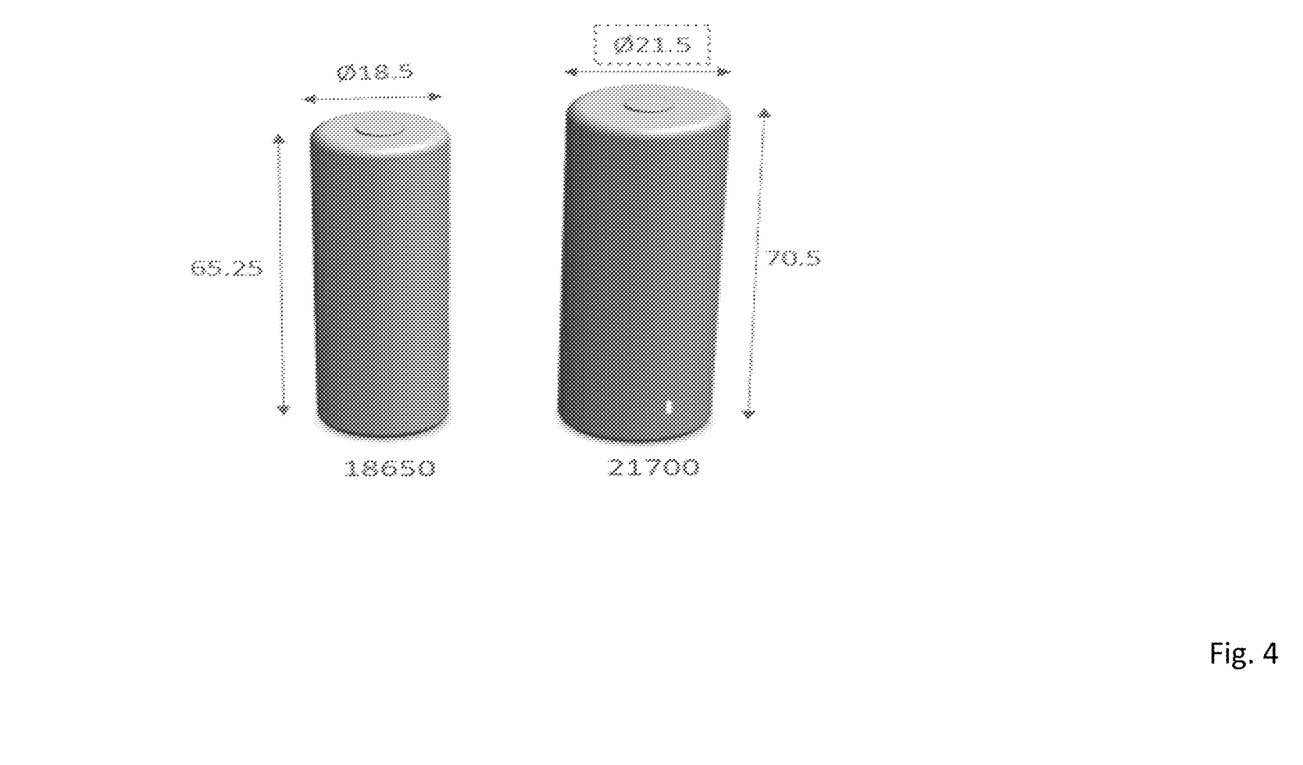
FIG. 4 is a battery diagram that depicts specifications for batteries having cell sizes of 18650 and 21700 in accordance with an illustrative embodiment.

In addition to improved efficiency and the ability to provide a constant desirable voltage to the motor, the proposed battery boost converter system also increases the number of battery options that will work in a given electric bicycle system. As an example, a given system may have a limited supply chain for batteries that will both fit into the system and adequately power the system. FIG. 4 is a battery diagram that depicts specifications for batteries having cell sizes of 18650 and 21700 in accordance with an illustrative embodiment. In alternative embodiments, batteries having different cell sizes and/or voltages may be used.

Figure 5:
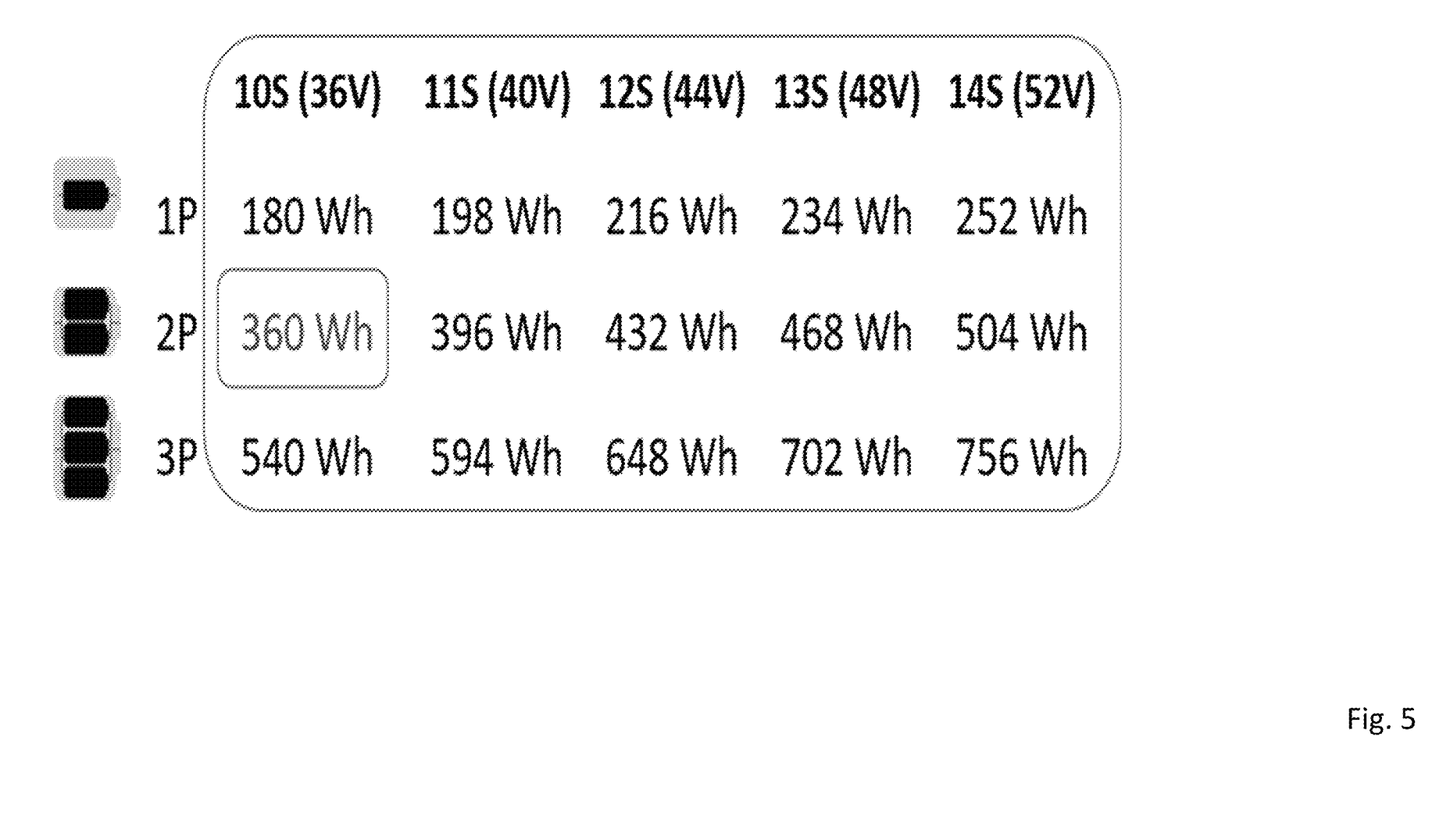
FIG. 5 is a chart that shows possible battery capacities that can be built using 21700 cells in series groups of 10 to 14 cells in accordance with an illustrative embodiment.

Given fluctuating conditions regarding battery supply chains, it is possible that the available battery options may be more limited in the future, and that, for example, it may be difficult to source 18650 batteries such that bicycle battery packs are formed from 21700 cells (or another available size). FIG. 5 is a chart that shows possible battery capacities that can be built using 21700 cells in series groups of 10 to 14 cells in accordance with an illustrative embodiment. In alternative embodiments, a different number of cells may be used in the series groups.

It is noted that a battery capacity of 360 Wh has been found to work well in many electric bicycles. With current energy densities, such a battery provides a great balance of small size while still providing good range. If one wanted a capacity at or near 360 Wh with 21700 cells, then a 10S (36V) battery would be required. However, the 36V nominal battery does not have high enough voltage to meet the performance requirements of an electric bicycle. In such a scenario, the proposed battery boost converter allows the bicycle to operate as a 60V system using the 10S 360 Wh battery.

Another situation where a boost converter helps to provide more supply chain options is by providing the ability to use large format cells (i.e., that are designed for larger electric vehicles) in an electric bicycle. For example, with the larger size one may only be able to fit five cells into a pack. Using the proposed system, those five cells would have a nominal voltage of 18V, which could get boosted to 60V to improve motor performance, as discussed herein.

In an illustrative embodiment, the power output of the boost converter can be in the range of 250 Watts (W) to 400 W. Alternatively, different power outputs may be used. With this power output, the proposed system should be able to achieve around 97% efficiency from the converter. Additionally, the increased efficiency from the motor at the higher voltage and increased efficiency in the motor controller from lower currents will more than make up for any losses introduced in the boost converter.

In another illustrative embodiment, to keep size and cost down, a very high switching frequency of 2.2 MHz can be used for the boost converter. This reduces cost and size of the inductor and capacitors utilized by the system. Normally with traditional MOSFETs this would result in very high switching losses. Thus, in one embodiment, a GaNFET (which can be switched much more quickly) can be used to perform the switching instead of a MOSFET. In alternative embodiments, a different switching frequency may be used.

In one embodiment, the proposed battery boost converter system can include a bypass that allows the boost converter to be bypassed during various operating conditions. For example, increasing the voltage on a brushless DC motor will increase the motor speed. The higher voltage created by the boost converter may be used only when the battery voltage is not high enough to maintain the desired speed at the desired torque. When the higher voltage is not needed, the boost converter will be bypassed. This will eliminate the losses in the voltage conversion. Along the same principle, the voltage of the boost converter can be slowly increased above the battery voltage when desired. The increase in voltage does not have to be a large jump in voltage. Such a controlled increase in voltage allows the boost converter and motor controller to operate with higher efficiency.

Figure 6:
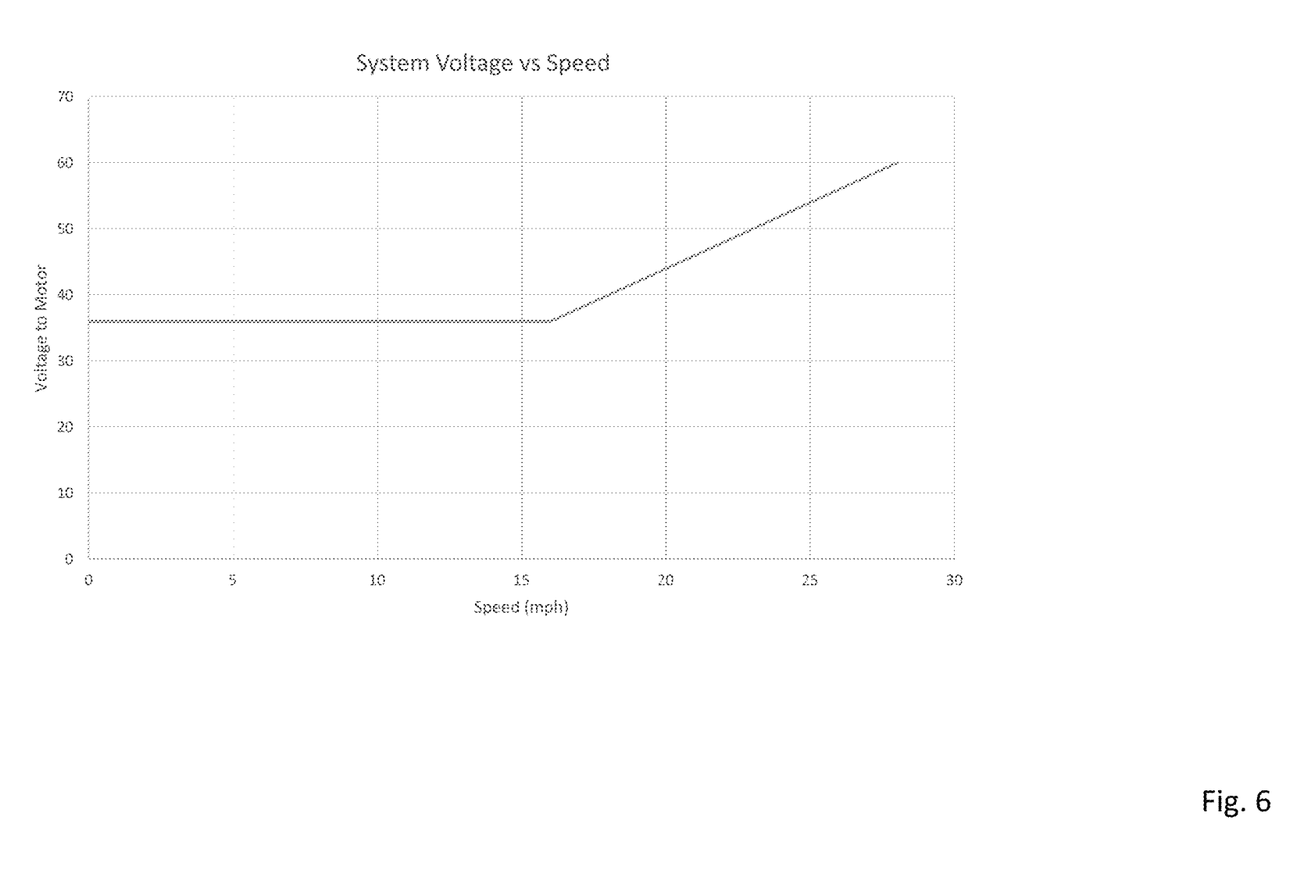
FIG. 6 is a diagram that depicts a relation by system voltage vs. speed in accordance with an illustrative embodiment.

FIG. 6 is a diagram that depicts a relation of system voltage vs. speed in accordance with an illustrative embodiment. As shown, the voltage of the motor remains at approximately 36 V until a speed of approximately 17 miles per hour (mph), at which point the voltage begins to increase.

Figure 7:
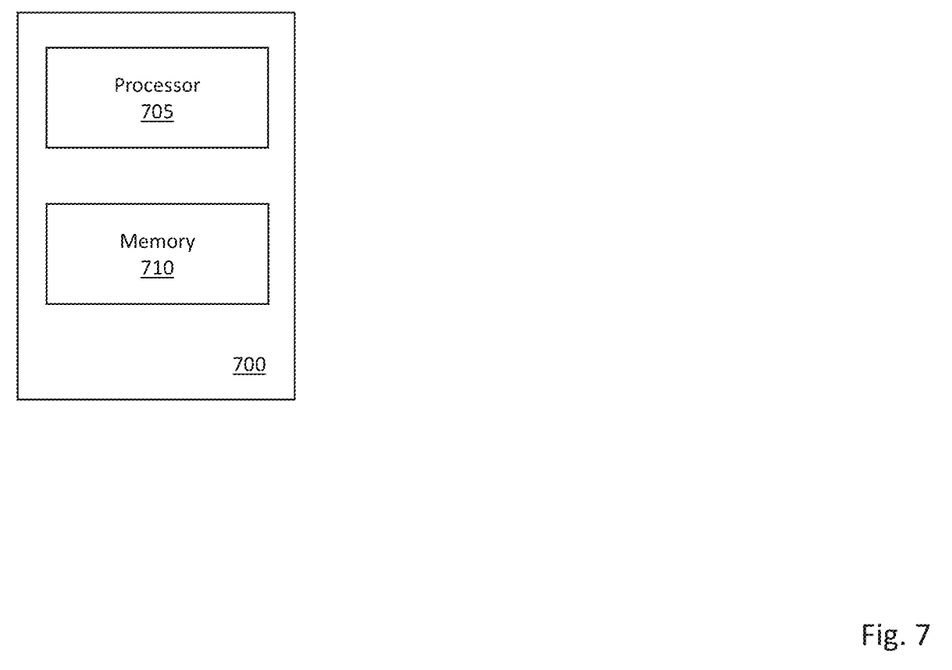
FIG. 7 depicts a computing system in accordance with an illustrative embodiment.

In an embodiment in which the proposed battery boost converter system includes a bypass that allows the boost converter to be bypassed during various operating conditions, the bypass can be implemented by a computing system. FIG. 7 depicts a computing system 700 in accordance with an illustrative embodiment. The computing system 700 can be incorporated into the boost converter in one embodiment. Alternatively, the computing system 700 can be incorporated as part of the motor controller and/or the motor in other embodiments. In one embodiment, the computing system 700 can be a main computer for the bicycle. The computing system 700 includes a processor 705 and a memory 710. In alternative embodiments, the computing system 700 may include additional components such as a network interface to facilitate communications, an operating system, a input/output (I/O) interface to control the input and output signals into the computing system 700, etc.

The memory 710 can be used to store operating instructions for the boost converter system in the form of machine-readable instructions. The processor 705 accesses the machine-readable instructions from the memory 710 and executes the instructions to perform the operations described herein. As an example, the memory 710 can store instructions to identify an operating condition of the electrical bicycle and to take an action based on the operating condition. The operating condition can be a condition in which the normal (or current) operating voltage of the battery is insufficient to maintain a desired speed and/or a desired torque of the bicycle. The desired speed and/or desired torque is determined by the rider. For example, the computing system 700 can be in (wired or wireless) communication with a controller (e.g., throttle, lever, button, computer display, etc.) that is used by the rider to set a desired speed and/or torque for the bicycle. In response to the operating condition being identified, the processor 705 can active the boost converter to increase the system voltage such that the desired speed and/or torque can be maintained. If the operating condition is no longer identified, the processor 705 bypasses the boost converter and allows the battery to again supply the system with its normal (or current) operating voltage.

The computing system 700 can also be used to control the speed at which the boost converter boosts the voltage from the battery. For example, the processor 705 can determine a voltage that is needed to satisfy a desired riding condition (e.g., a desired speed), and can slowly increase the voltage to the motor from the current voltage to the determined voltage over a predetermined period of time. The period of time can be a fraction of a second (e.g., 0.1 s, 0.5 s. 0.75 s, etc.), over a course of seconds (s) (e.g., over 5 s, 10 s, 30 s, 60 s, etc.), over a course of minutes, etc. This gradual increase in voltage avoids a rapid voltage jump, which can be detrimental to the system. In alternative embodiments, circuit elements such as a voltage detector and circuit logic can be used instead of a computing system to control the boost converter.

Figure 8:
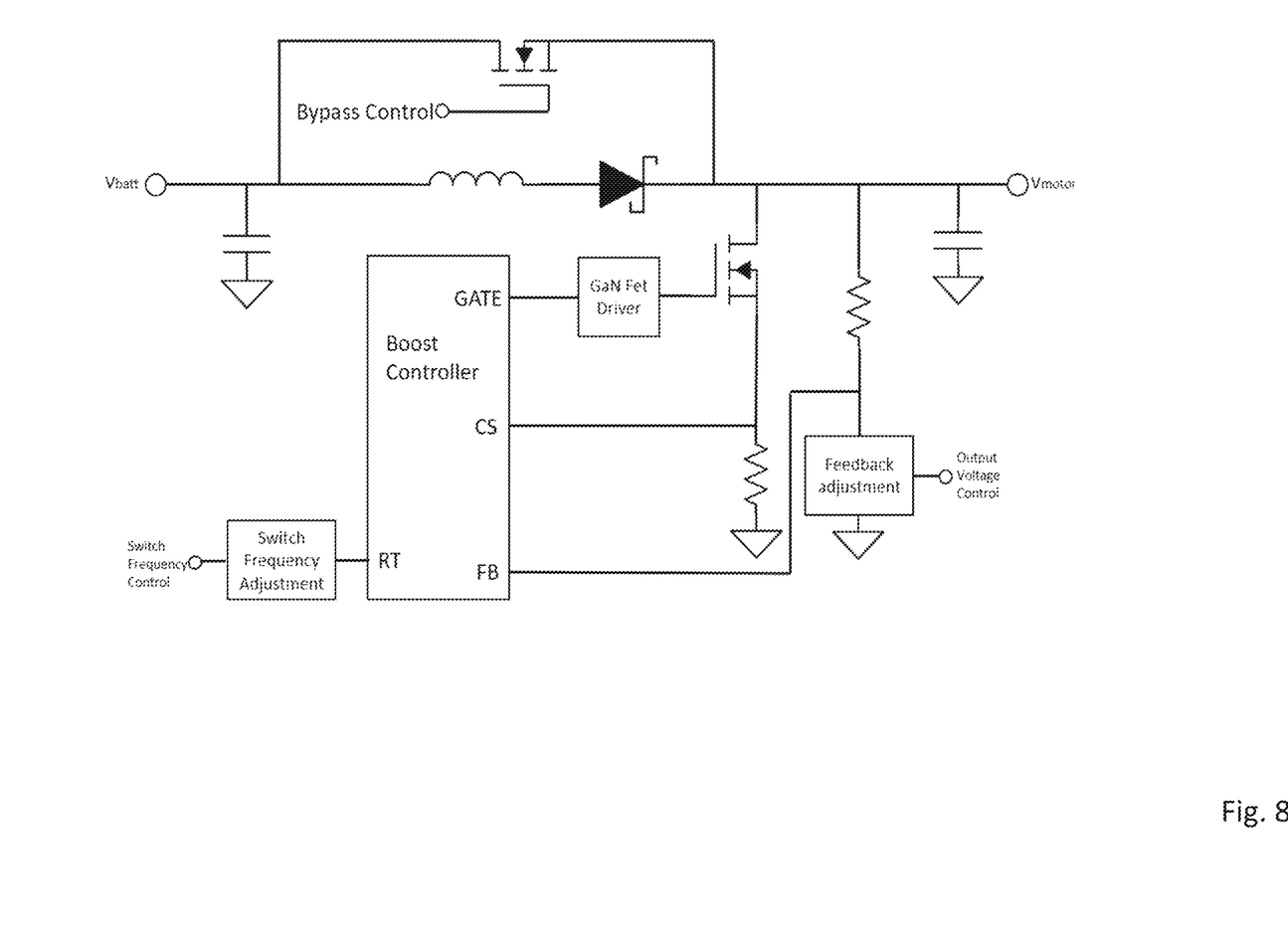
FIG. 8 is a circuit diagram to implement a boost converter in accordance with an illustrative embodiment.

FIG. 8 is a circuit diagram to implement a boost converter in accordance with an illustrative embodiment. As shown, the circuit is placed between a battery ($V_{batt}$) and a motor ($V_{motor}$). The circuit includes a bypass control to bypass use of the boost circuit during operating conditions in which a voltage boost is not to be used, as discussed herein. The circuit also includes a switch frequency control, a boost controller, a gallium nitride (GaN) field effect transistor (FET) driver, switch frequency adjustment, and feedback adjustment. In alternative embodiments, the boost converter circuit may include fewer, additional, and/or different components.

As shown, the battery and the motor are each connected to a separate grounded capacitor. A metal-oxide semiconductor field effect transistor (MOSFET) is connected between the battery and the motor, and is used to implement the bypass control to improve efficiency as described herein. Also included between the battery and the motor (on a circuit branch that is used when the bypass is not active) are an inductor and a diode.

In one embodiment, an off the shelf boost controller (or converter) can be used as the main control integrated circuit for the boost converter system. Alternatively, a custom boost controller may be used. The drive strength of the boost controller may not be strong enough for the high speed switching of the GaN FET being used to implement the boost controller, so the circuit includes a separate GaN FET driver connected to a gate of the boost controller and to the FET. The FET connects to the circuit branch between the battery and the motor. The FET also connects to the common source of the boost controller and to ground through a resistor. The feedback adjustment includes a voltage detector to detect system voltage. The feedback adjustment connects the circuit branch between the battery and the motor (via a resistor), and also to an output voltage controller. The feedback adjustment is also connected as an input (FB) of the boost controller. The switch frequency adjustment is connected to a switch frequency controller and an input (RT) of the boost controller. In an alternative embodiment, a separate microcontroller can be used for bypass control, output voltage control, and switch frequency control, as described with reference to FIG. 7.

Figure 9:
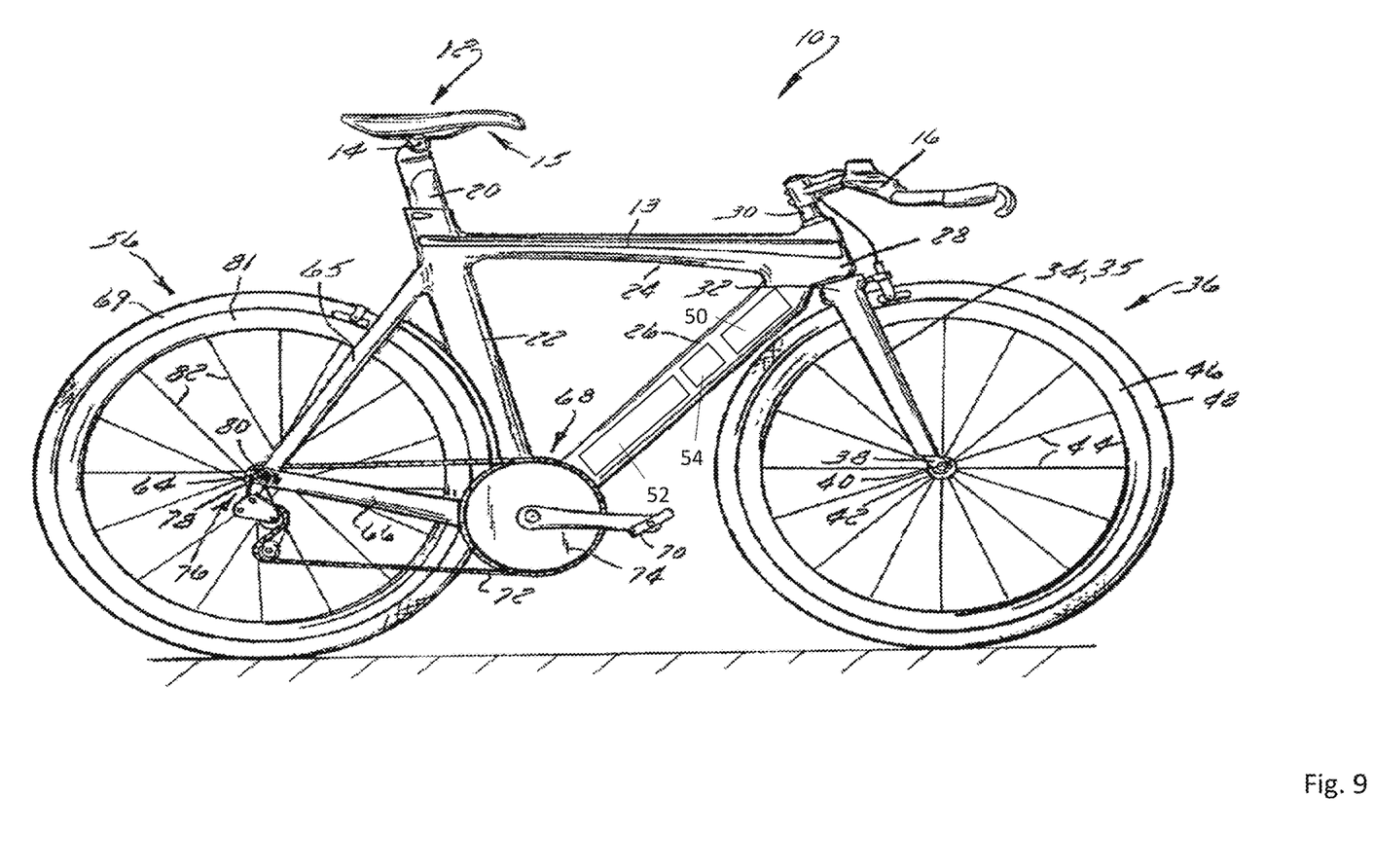
FIG. 9 depicts an electric bicycle 10 with a boost converter system in accordance with an illustrative embodiment.

FIG. 9 depicts an electric bicycle 10 with a boost converter system in accordance with an illustrative embodiment. The bicycle 10 includes a frame 13 to which a seat assembly 12 and handlebars 16 are attached. Mounted within or on the frame 13 are a battery 50, a motor 52, and a boost converter system 54. A seat clamp 14 is engaged with an underside 15 of seat assembly 12 and cooperates with the motorized dropper post assembly 20 that slidably engages a seat tube 22 of frame 13. The motorized dropper post assembly 20, which is described in more detail below, enables automated low noise adjustment of the seat height. A top tube 24 and a down tube 26 extend forwardly from seat tube 22 to a head tube 28 of frame 13.

Handlebars 16 of the bicycle 10 are connected to a steerer tube 30 that passes through head tube 28 and engages a fork crown 32. A pair of fork blades 34, 35 extend from generally opposite ends of fork crown 32 and are constructed to support a front wheel assembly 36 at an end thereof or fork tip 38. The fork blades 34, 35 can be part of a suspension bicycle fork or a rigid bicycle fork. As also shown in FIG. 1, fork tips 38 engage generally opposite sides of an axle 40 that is constructed to engage a hub 42 of front wheel assembly 36. A number of spokes 44 extend from hub 42 to a rim 46 of front wheel assembly 36. A tire 48 is engaged with rim 46 such that rotation of tire 48, relative to forks 34, rotates rim 46 and hub 42.

A rear wheel assembly 56 is positioned generally concentrically about a rear axle 64. A seat stay 65 and a chain stay 66 offset rear axle 64 from a crankset 68. The crankset 68 includes pedals 70 that are operationally connected to a flexible drive such as a chain 72 via a chain ring or sprocket 74. Rotation of the chain 72 communicates a drive force to a rear section 76 of the bicycle 10 having a gear cluster 78 positioned thereat. The gear cluster 78 is generally concentrically orientated with respect to the rear axle 64 and includes a number of variable diameter gears. The gear cluster 78 is operationally connected to a hub 80 associated with a rear tire 69 of rear wheel assembly 56. A number of spokes 82 extend radially between the hub 80 and a rim 81 that supports tire 69 of rear wheel assembly 56. As is commonly understood, rider operation of the pedals 70 drives the chain 72 thereby driving the rear tire 69 which in turn propels the bicycle 10. The chain can also be driven by the motor 52.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A battery boost converter system for a bicycle, comprising:
   a bicycle frame;
   a motor mounted to the bicycle frame;
   a battery mounted to the bicycle frame and configured to provide power to the motor;
   a boost converter that includes a boost circuit having a boost controller and a field-effect transistor, wherein the field-effect transistor connects to a circuit branch between the motor and the battery, wherein the field-effect transistor also connects to a common source of the boost controller, and wherein the boost converter is configured to:
   receive a first output signal from the battery and to provide a second output signal to the motor; and
   determine, based on an operating condition, whether to boost a voltage of the first output signal such that the second output signal has an increased voltage.

2. The system of claim 1, wherein the operating condition is an operating voltage for the motor, and wherein the boost converter is configured to bypass the boost circuit responsive to a determination that the first output signal from the battery satisfies the operating voltage for the motor such that the second output signal is the same as the first output signal.

3. The system of claim 2, wherein the boost converter is configured to use the boost circuit responsive to a determination that the first output signal from the battery does not satisfy the operating voltage for the motor such that the second output signal is boosted relative to the first output signal.

4. The system of claim 1, wherein the operating condition comprises a desired speed of the bicycle.

5. The system of claim 1, wherein the operating condition comprises a desired torque of the bicycle.

6. The system of claim 1, wherein the boost converter is configured to gradually increase the voltage of the first output signal over a predetermined period of time.

7. The system of claim 1, wherein the boost converter includes a field-effect transistor driver coupled to the field effect transistor.

8. The system of claim 7, wherein the field-effect transistor comprises a gallium nitride field-effect transistor.

9. The system of claim 1, wherein the circuit branch of the boost circuit includes an inductor and a diode positioned between the battery and the motor.

10. The system of claim 9, wherein the boost circuit includes a bypass controller connected to the circuit branch of the boost circuit that is between the battery and the motor.

11. A method of controlling voltage of a bicycle, the method comprising:
    receiving, at a boost converter, a first output signal from a battery that is mounted to a frame of the bicycle, wherein the boost converter includes a boost circuit having a boost controller and a field-effect transistor, wherein the field-effect transistor connects to a circuit branch between a motor of the bicycle and the battery, wherein the field-effect transistor also connects to a common source of the boost controller;
    determining, based on an operating condition of the bicycle, whether to boost the first output signal; and
    boosting, by the boost converter and responsive to a determination that the first output signal is to be boosted, the first output signal to generate a second output signal that has an increased voltage relative to the first output signal, wherein the second output signal is provided to the motor that is mounted to the frame of the bicycle.

12. The method of claim 11, wherein the operating condition is an operating voltage for the motor.

13. The method of claim 12, further comprising bypassing, by the boost converter, the boost circuit responsive to a determination that the first output signal from the battery satisfies the operating voltage for the motor.

14. The method of claim 11, wherein the operating condition comprises a desired speed of the bicycle.

15. The method of claim 11, wherein the operating condition comprises a desired torque of the bicycle.

16. The method of claim 11, wherein the boosting comprises gradually increasing the voltage of the first output signal over a predetermined period of time.

17. The method of claim 11, wherein the boost converter includes a field-effect transistor driver coupled to the field effect transistor.

18. The method of claim 17, wherein the field-effect transistor comprises a gallium nitride field-effect transistor.

19. The method of claim 11, wherein the circuit branch of the boost circuit includes an inductor and a diode positioned between the battery and the motor.

20. The method of claim 11, wherein the boost circuit includes a bypass controller connected to the circuit branch of the boost circuit that is between the battery and the motor.

* * * * *